Patented Jan. 2, 1923.

1,441,181

UNITED STATES PATENT OFFICE.

SAMUEL E. SHEPPARD, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed April 1, 1921. Serial No. 457,753.

*To all whom it may concern:*

Be it known that I, SAMUEL E. SHEPPARD, a subject of the King of Great Britain, residing at Rochester, in the county of Monroe and State of New York, have invented certain new and useful Improvements in Cellulose-Ether Compositions, of which the following is a full, clear, and exact specification.

This invention relates to new compositions of matter in which cellulose ethers are mixed with other substances, so that the resulting product can be advantageously used in the plastic and analogous arts, such, for instance, as sheet or film manufacture and varnish manufacture.

One object of my invention is to provide a composition which may be made into permanently transparent, strong and flexible sheets, films, or moulded articles which possess the desired properties in the plastic arts. Further objects will hereinafter appear.

I have discovered that a composition of matter having the properties desired in the film-making and other plastic arts can be obtained by mixing or compounding a cellulose ether of the type indicated in U. S. Patent No. 1,188,376, Lilienfeld, June 20, 1916, with hydrogenation products of the hydrocarbons $C_{2n}H_{n+3}$ and their homologues. These hydrogenated substances are individual solvents of the cellulose ethers, but they may also be employed in conjunction with other compounds, as will be apparent to those skilled in the art.

The following substances may be mentioned as two typical examples of the hydrogenated carbocyclic compounds which I may employ in exercising my invention. One of them is tetrahydronaphthalene. This is commercially known as tetraline, which may contain small amounts of other hydrogenated bodies. It boils between 205 and 207° C. Another of them is dekahydronaphthalene. This is known commercially as dekaline and has a boiling point between 190 and 195° C. It may contain some tetrahydronaphthalene.

I may dissolve, by way of illustration, cellulose ethers, like water-insoluble ethyl cellulose, in either tetraline or dekaline, or a mixture thereof, until a strong viscous homogeneous solution is obtained. But these solvents, as indicated by their high boiling point, have a relatively small volatility, and consequently a film formed from a plain solution in these solvents cures rather slowly. In order to facilitate a rapid setting of the film under manufacturing conditions, I use more volatile substances as a vehicle in which to carry the other ingredients.

For instance, I may dissolve 100 to 200 parts by weight of cellulose ether in a mixture containing 600 to 900 parts of chloroform, 300 to 450 parts of ethyl alcohol (denatured if desired) and 15 to 30 parts of dekaline or tetraline, or a mixture thereof. Many other equivalent ingredients may be substituted, such as benzol for chloroform.

The resultant solutions are sufficiently viscous to be properly flowed during film manufacture, the volatile vehicle passing away, but not too rapidly to impair the product.

Other substances which impart useful qualities to the film may be added if desired, such, for instance, as triphenyl or tricresyl phosphate, camphor, monochlornaphthalene, etc., but these are not essential, because excellent films are yielded when the hydrogenated hydrocarbons are employed as the only low-volatile parts of the solvent mixture.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A composition of matter, comprising cellulose ether and a hydrogenation product of the hydrocarbons $C_{2n}H_{n+3}$ and their homologues.

2. A composition of matter, comprising cellulose ether and a hydrogenation product of naphthalene.

3. A composition of matter, comprising cellulose ether and a hydrogenation product of naphthalene containing 4 added hydrogen atoms.

4. A composition of matter, comprising ethyl cellulose and a hydrogenation product of the hydrocarbons $C_{2n}H_{n+3}$ and their homologues.

5. A composition of matter, comprising ethyl cellulose and a hydrogenation product of naphthalene containing 4 added hydrogen atoms.

6. A composition of matter, comprising ethyl cellulose and tetrahydronaphthalene.

7. A flowable film-forming composition of matter, comprising cellulose ether, a hydrogenation product of the hydrocarbons $C_{2n}H_{n+3}$ and their homologues, and a volatile vehicle carrying such ingredients.

8. A composition of matter, comprising cellulose ether, a hydrogenation product of naphthalene and a volatile common solvent.

9. A composition of matter, comprising cellulose ether, a hydrogenation product of naphthalene, chloroform and alcohol.

10. A composition of matter, comprising ethyl cellulose, tetrahydronaphthalene, chloroform and alcohol.

11. As an article of manufacture, a deposited or flowed film, comprising cellulose ether and a hydrogenation product of the hydrocarbons $C_{2n}H_{n+3}$ and their homologues.

12. As an article of manufacture, a deposited or flowed flexible film, comprising cellulose ether and a hydrogenation product of naphthalene.

13. As an article of manufacture, a deposited or flowed flexible film, comprising an alkyl ether of cellulose and a hydrogenation product of naphthalene in which there are 4 added hydrogen atoms.

14. As an article of manufacture, a deposited or flowed flexible transparent film, comprising water-insoluble ethyl cellulose and tetrahydronaphthalene.

Signed at Rochester, New York, this 30th day of March 1921.

SAMUEL E. SHEPPARD.